(12) United States Patent
Ruth

(10) Patent No.: US 6,494,423 B1
(45) Date of Patent: Dec. 17, 2002

(54) LOCKING TELESCOPING MEMBER WITH ATTITUDE-RESPONSIVE RELEASE

(75) Inventor: Stephen M. Ruth, Holly, MI (US)

(73) Assignee: Means Industries, Inc., Saginaw, MI (US)

(*) Notice: Subject to any disclaimer, the term of this patent is extended or adjusted under 35 U.S.C. 154(b) by 0 days.

(21) Appl. No.: 10/082,611

(22) Filed: Feb. 25, 2002

(51) Int. Cl.[7] ............................................. A47B 91/00
(52) U.S. Cl. ................................ 248/188.8; 248/188.9
(58) Field of Search .................. 248/346.01, 292.13, 248/188.8, 188.9; 280/301, 293, 298, 304

(56) References Cited

U.S. PATENT DOCUMENTS

| | | | |
|---|---|---|---|
| 1,143,780 A | * | 6/1915 | Pinto .......................... 280/298 |
| 3,712,640 A | * | 1/1973 | Shipman et al. ............ 280/301 |
| 4,169,687 A | | 10/1979 | Schull |
| 4,417,746 A | | 11/1983 | Baron |
| 4,432,562 A | | 2/1984 | Cline |
| 4,494,764 A | * | 1/1985 | Kelley ........................ 280/293 |
| 4,580,804 A | | 4/1986 | Weber |
| 4,986,557 A | | 1/1991 | Muszynski |
| 5,388,848 A | | 2/1995 | Silva et al. |
| 6,206,139 B1 | | 3/2001 | Bogart, Jr. |
| 6,237,718 B1 | | 5/2001 | Schwarzel |
| 6,276,707 B1 | | 8/2001 | Ungvari |

* cited by examiner

Primary Examiner—Ramon O. Ramirez
(74) Attorney, Agent, or Firm—Brooks & Kushman, P.C.

(57) ABSTRACT

An adjustable-length support member, such as a motorcycle kickstand, includes a generally-tubular outer member defining a longitudinal bore with at least one recess formed in a surface of the bore, and an inner member telescopingly received in the longitudinal bore of the outer member including a plurality of recesses. The support member further includes a tension spring urging the inner member to a retracted position relative to the outer member, and at least one gravity-responsive locking element carried within a respective recess of one of the inner and outer members, wherein the locking element is urged by gravity out of engagement with a recess of the other of the inner and outer members as the attitude of the two members moves between an operative orientation and a stowage orientation.

17 Claims, 4 Drawing Sheets

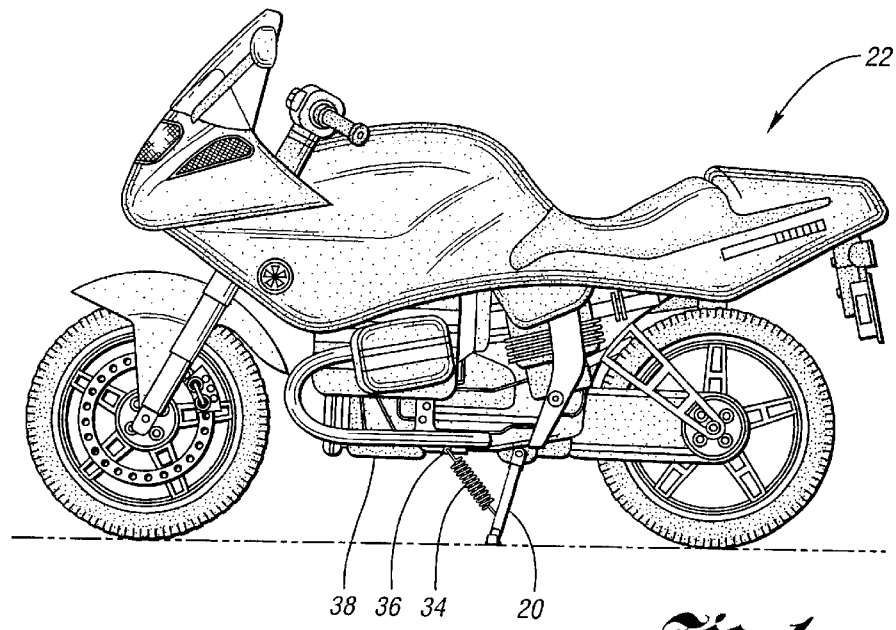
*Fig. 1*
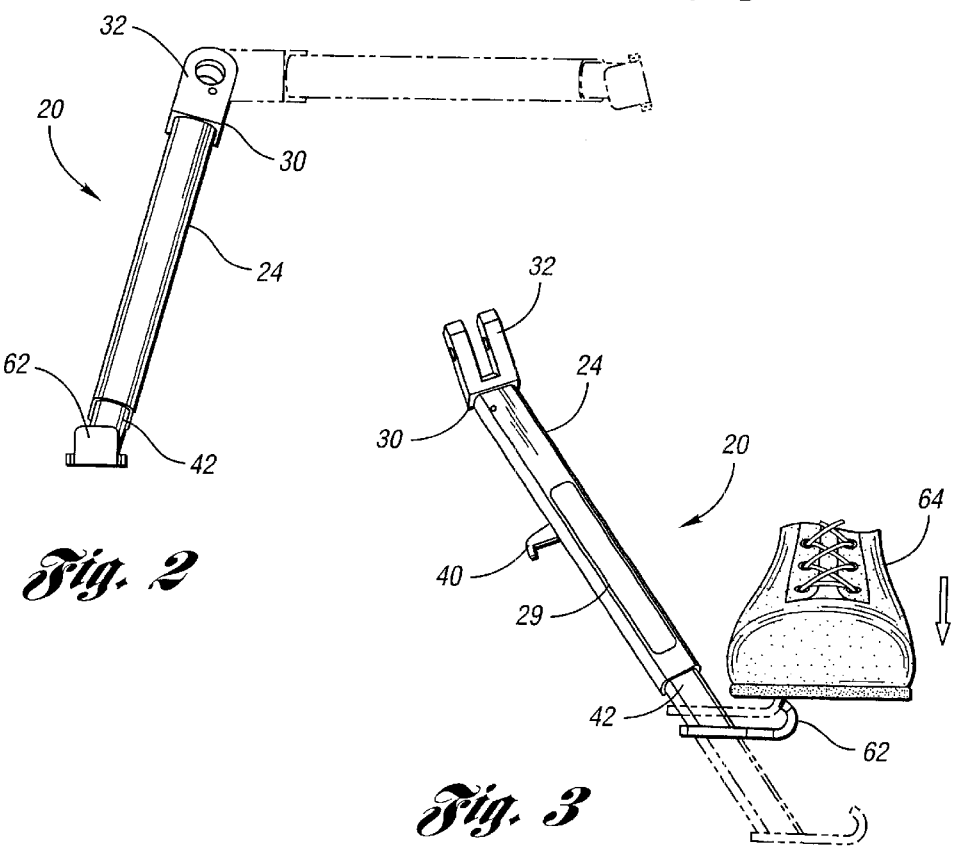
*Fig. 2*
*Fig. 3*

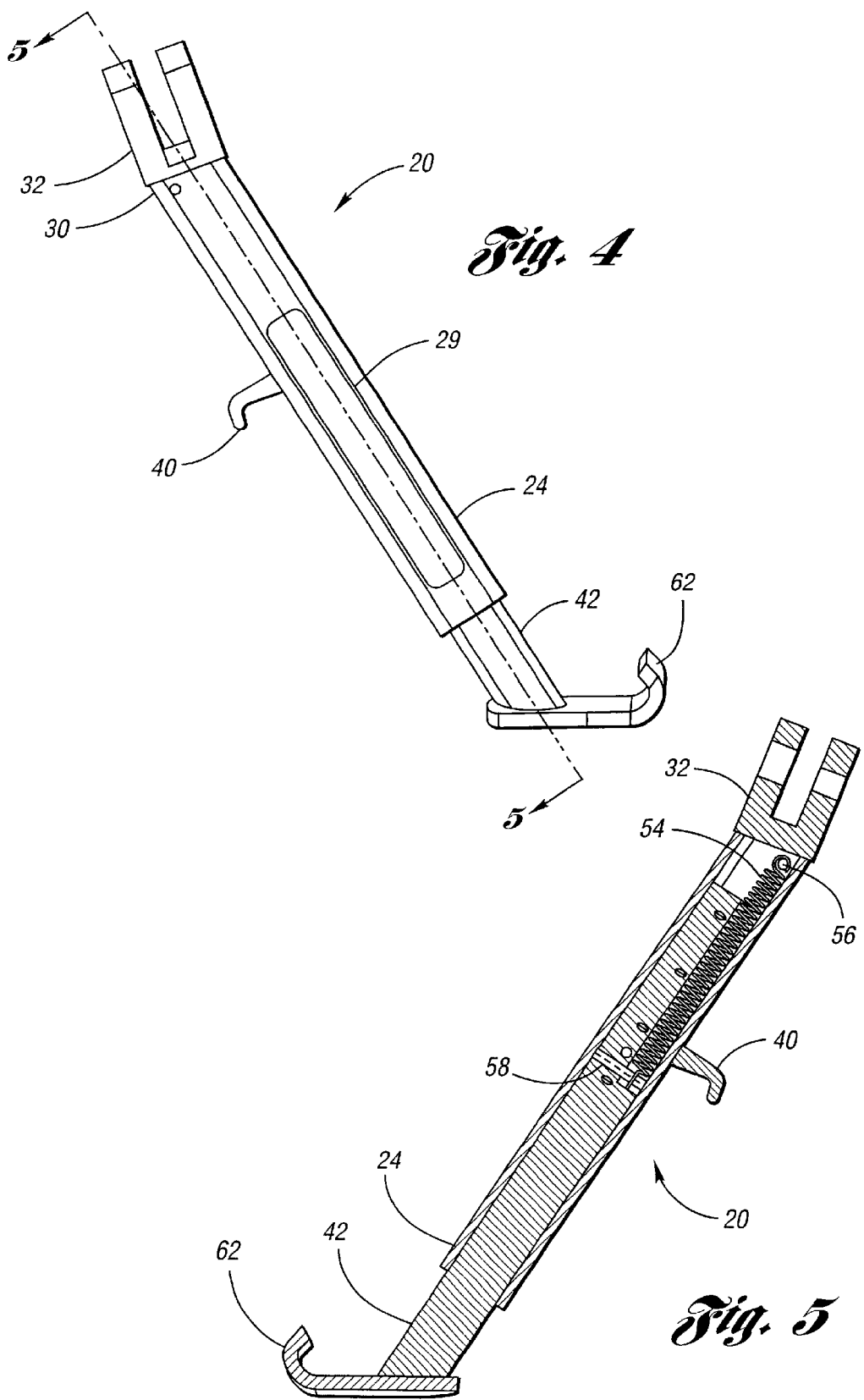

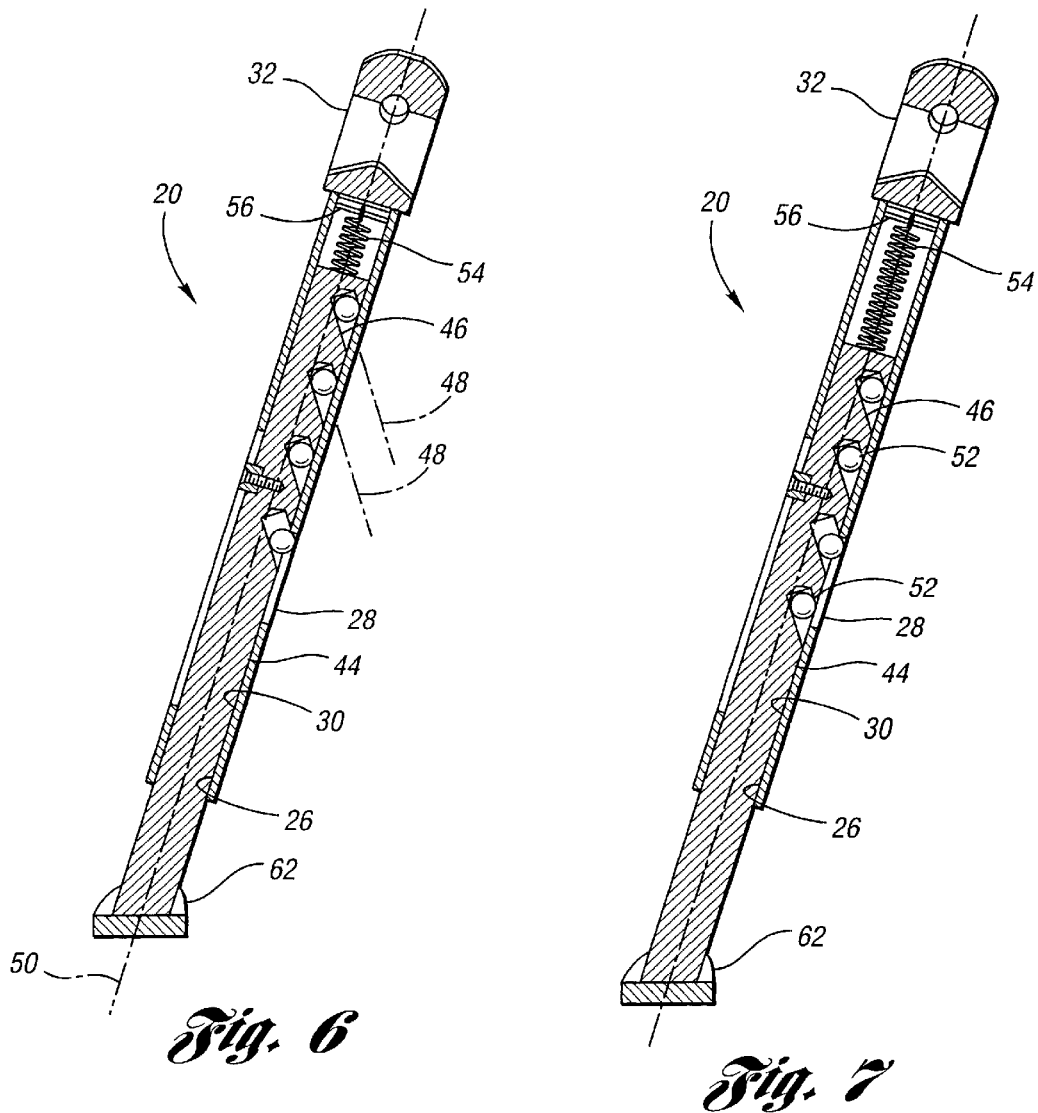
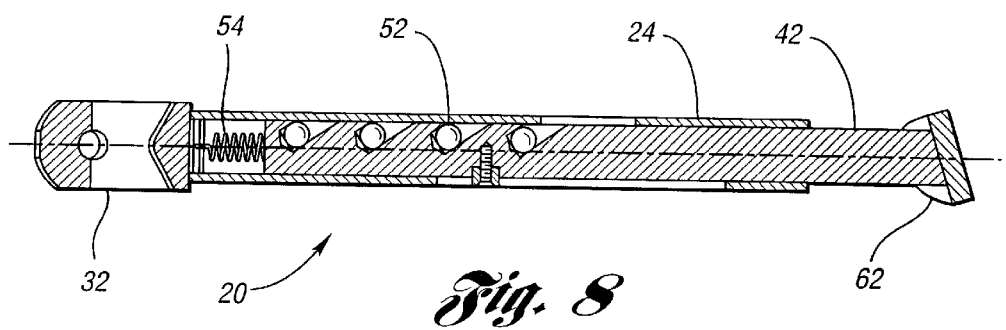

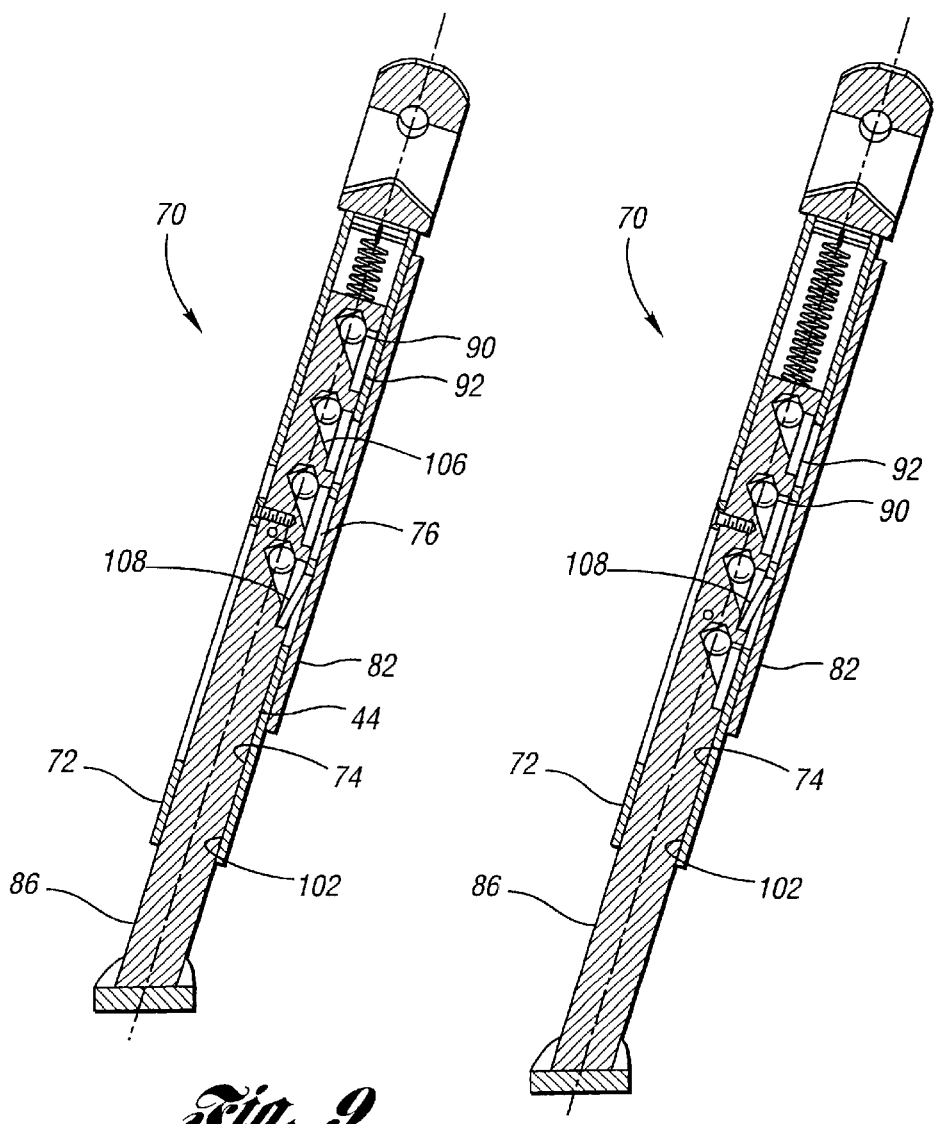
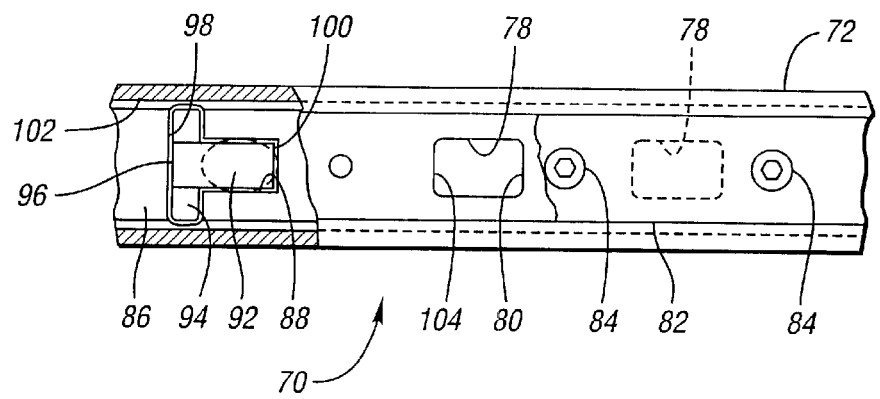

LOCKING TELESCOPING MEMBER WITH ATTITUDE-RESPONSIVE RELEASE

BACKGROUND OF THE INVENTION

1. Field of the Invention

The invention relates to locking telescoping members that are often used to support or level a given object or device.

2. Background Art

The prior art teaches a myriad of extendable support members or legs for a variety of objects and devices, by which each are provided a limited ability to accommodate an uneven or inclined supporting surface. Often, the object or device is a portable device that preferably accommodates a wide variety of such supporting surfaces through use of one or more such extendable support members. Generally, known extendable support members include a pair of coaxial, telescoped members, wherein one member is selectively translated relative to the other in order to achieve an extended condition providing the support with a desired overall length, perhaps with the aid of a screw drive or a ratchet-tensioned pulley system. The support is thereafter maintained in an extended condition with a locking mechanism that may include a transverse locking pin, a rotatable chuck or locking collar, or a ratchet mechanism. Upon release of the locking mechanism, the one member may be moved in the opposite direction, perhaps with the aid of a return spring, to thereby return the support to a retracted condition.

For purposes of illustration, in the context of an adjustable-length kickstand for a motorcycle, the relative translation of the one member relative to the other member is often achieved with the aid of gravity, with the one member sliding relative to the other member once both an associated stowage lock has been released and the kickstand has been pivoted from a generally horizontal stowage position to a generally vertical position, as taught in U.S. Pat. No. 4,432,562. Alternatively, the one member is manually extended relative to the other member, either by hand or using the operator's foot, perhaps as further resisted by a return spring.

Once adjusted to the desired overall length, the members of the kickstand are locked relative to one another, for example, by insertion of a locking pin through a pair of aligned holes formed in the members as in U.S. Pat. No. 5,388,848, or by tightening an encompassing collar so as to generate an interference between the two members as in U.S. Pat. No. 4,169,687, or by tightening a set screw as in U.S. Pat. No. 4,986,557. Another approach is to employ a ratchet mechanism as in U.S. Pat. No. 4,432,562. Yet another approach is to include a cooperating pin and slot mechanism as taught in U.S. Pat. No. 4,580,804, in which the extended member is rotated about its longitudinal axis such that a projecting pin on the extended member is urged into one of several longitudinally-spaced canted slots.

When the kickstand is to be longitudinally collapsed, the locking mechanism is manually deactivated or decoupled, as by removing the locking pin, or turning the chuck or collar, or tensioning a release cable for the ratchet mechanism of U.S. Pat. No. 4,432,562, or counter-rotating the one member to disengage the cooperating pin and slot mechanism of U.S. Pat. No. 4,580,804, whereupon the one member may be moved back to a retracted position relative to the other member. Unfortunately, such manual deactivation or decoupling of the locking mechanism and, particularly, those requiring the relative rotation of a locking mechanism or one of the members themselves, can be difficult because the motorcycle operator must simultaneously balance the weight of the motorcycle.

Accordingly, what is needed is an adjustable telescoping support member that is simply and readily extended and automatically locked when its attitude is changed from a first orientation to a second, orientation relative to plumb and, further, whose locking mechanism is readily operated to decouple the support's telescoping members without any external manipulation once the support is returned to, or moved through, the first orientation.

SUMMARY OF THE INVENTION

Under the invention, an extendable support member includes a first elongate member defining a longitudinal bore along a longitudinal axis, wherein an inner surface of the bore includes a recess; and a second elongate member adapted to be received in the longitudinal bore of the first member, wherein an outer surface of the second member includes a recess that is canted relative to the longitudinal axis.

The support member further includes at least one gravity-responsive locking element, preferably carried within a respective recess of one of the inner and outer members, wherein the locking element is movable within the recess under the influence of gravity from a first engaged position coupling the first member to the second member, to a second position that permits relative movement of the first and second members, as the first and second members are moved from a first relative attitude to a second relative attitude by pivoting the first member from an operative orientation to a stowage orientation. In a preferred embodiment, the locking element includes an element, such a hardened steel ball, that rolls within the recess of the second member. The locking element similarly preferably moves in response to gravity from the second position toward the first position as the first and second members are moved back into the first relative attitude, e.g., into the operative orientation, to thereby provide automatic "locking" of the extended second member when in the operative orientation.

In accordance with another feature of the invention, the locking element can include one or more struts, preferably carried within respective recesses of one of the members, that pivots between a first position that permits relative movement of the members and a second position in which the ends of the strut respectively engage the recesses of the inner and outer member to thereby lock the inner member relative to the outer member. While the strut can be formed such that the strut itself responds to gravity in accordance with the invention to thereby the respective ends into engagement with the members, the invention contemplates use of an additional gravity-responsive element, such as the rolling element described above, to assist in so biasing each strut. To facilitate decoupling of the strut when the support member is in the stowage orientation, and to further ensure that the back end of the strut will not pop up to prevent extension of the second member when in the operative orientation, the strut preferably includes a pair of laterally-extending arms proximate to a second end opposite the first end, and wherein the inner surface of the first member overlies the arms of the strut to maintain the second end of the strut in the recess of the second member.

In accordance with another feature of the invention, the support member further includes a spring urging the second member toward a retracted position relative to the first member. The spring ensures the continued locking of the extended second member within the first member until the first member is moved to the stowage orientation and the second member is slightly extended to thereby permit gravity to urge the locking element back toward its first, decoupled position. In a preferred embodiment, the spring is disposed within the longitudinal bore of the first member.

Other advantages, features, and benefits of the invention will be readily apparent from the following detailed description of a preferred embodiment, when taken in connection with the accompanying Drawings.

BRIEF DESCRIPTION OF THE DRAWINGS

FIG. 1 is an elevation of a motorcycle that includes a first exemplary kickstand in accordance with the invention;

FIG. 2 is a front elevation of the first kickstand in the operative orientation, with the stowage orientation further illustrated in phantom;

FIG. 3 is a side elevation of the first kickstand as the inner telescoping member is urged downwardly by a rider's foot, as resisted by an internal tension spring;

FIG. 4 is another side elevation of the first kickstand;

FIG. 5 is a longitudinal cross-section showing the first kickstand's inner and outer members, along with the internal tension spring;

FIG. 6 is another longitudinal cross-section, taken along Line 5—5 of FIG. 4, showing the first kickstand's lowermost spherical gravity-responsive locking element engaging a corresponding locking recess defined in the outer member's longitudinal bore;

FIG. 7 is a view similar to that of FIG. 6, with the first kickstand's inner member extended such that another spherical locking element is received in the locking recess FIG. 8 is a view similar to that of FIG. 6, with the first kickstand pivoted to the stowage condition such that the spherical locking members have moved within their respective canted recesses in the inner member and out of engagement with the outer member's locking recess;

FIGS. 9 and 10 are longitudinal cross-sections, similar to those of FIGS. 6 and 7, of a second exemplary kickstand whose locking elements each include both a gravity-responsive sphere, and a pivoting strut that is urged by the sphere against the inner surface further of the outer member's longitudinal bore; and FIG. 11 is a partial elevation, partially broken away, of the second kickstand, taken in the direction of Arrow 11 in FIG. 9.

DETAILED DESCRIPTION OF THE PREFERRED EMBODIMENT

Referring to FIGS. 1–8, a first exemplary kickstand 20 for a motorcycle 22 includes an elongate generally-tubular outer member 24 defining a longitudinal bore 26 with at least one recess 28 formed in an inner surface 30 of the bore 26. While the invention contemplates any suitable manner for defining at least one recess 28 in the inner surface 30 of the bore 26, in the first kickstand 20, each recess 28 is defined as an elongated slot that is milled in the wall of the outer member's generally tubular stock. The milled slot is preferably covered with a suitable cover label or plate 29 that may conveniently be glued to the outer surface of the outer member 24.

With particular reference to FIGS. 2 and 3, the upper end 30 of the outer member 24 includes a yoke 32 by which the first kickstand 20 is pivotally mounted on the motorcycle 22, for movement between a stowage orientation (illustrated in phantom in FIG. 2) and an operative orientation (illustrated in solid line in FIG. 2). A tension spring 34 extending between an attachment point 36 the motorcycle frame 38 and a projecting lever arm 40 on the outer member 24 operates in a known manner to maintain the kickstand 20 in an "over-center" locked condition in both the stowage orientation and the operative orientation.

As best seen in FIGS. 4–8, the first kickstand 20 also includes an elongate inner member 42 telescopingly received in the bore 26 of the outer member 24, whose outer surface 44 includes a plurality of longitudinally-spaced recesses 46. While the recesses 46 may be formed in any appropriate manner, in the first kickstand 20, the recesses 46 that are conveniently formed as cylindrical bores whose nominal axes 48 are canted with respect to the inner member's nominal longitudinal axis 50, as seen in FIG. 6.

A plurality of gravity-responsive locking elements 52 are carried within the recesses 46 of the inner member 42. While the invention contemplates locking elements of any suitable configuration, in the first kickstand 20, each locking element 52 is a hardened steel ball having a diameter slightly greater than the width of the milled slot defining the recess 28 of the outer member 24. In accordance with the invention, each steel ball 52 "rolls" within its respective cylindrical recess 46 in response to gravity as the attitude of the kickstand 20 is changed. In this manner, the steel balls 52 are each independently urged by gravity into and out of engagement with the inner surface of the outer member 24, including any recess of the outer member 24 in registration with a given ball's recess in the inner member, as the kickstand 20 is pivoted into and out of its operative orientation.

As best seen in FIG. 5, the first kickstand 20 further includes a tension spring 54 disposed within the bore 26 of the outer member 24 and coupled at its respective ends to the outer and inner members 24,32 by a suitable pin 56,58. The tension spring 54 urges the inner member 42 to a retracted position relative to the outer member 24, and otherwise serves to maintain engagement of a given steel ball 52 with a recess of each of the members 24,42 after the inner member 42 has been extended relative to the outer member 24. A base plate 62 on the lowermost portion of the inner member 42 defines an enlarged "foot" that provides increased footing to the first kickstand 20, even on relatively-soft ground.

In use, a motorcycle operator uses his foot 64 to pivot the kickstand 20 from the stowage orientation (shown in phantom in FIG. 2) to the operative orientation (shown in solid lines in FIG. 2). As noted above, the external spring 34 is advantageously positioned relative to the kickstand pivot such that the kickstand 20 remains in either of the "over-center" stowage or operative orientations until the operator urges the kickstand 20 to the other of the orientations (or, if the kickstand 20 is in the operative orientation, in the event of a sufficient forward movement of the motorcycle 22). Once pivoted to its locked, over-center operative orientation, and while the operator maintains a desired amount of "lean" to the motorcycle 22, the operator uses his foot 64 as illustrated in FIG. 3 to extend the inner member 42 relative to the outer member 24, against the resistance of the inner spring 54. As the inner member 42 extends, the steel balls 52 are urged by gravity against the inner surface 30 of the outer member's longitudinal bore 26, and into and out of a given recess 28 of the outer member 24.

The desired amount of extension is obtained as the operator pushes the base plate 62 down toward the ground until the base plate 62 makes contact with the ground, at which point the operator removes his foot 64. The inner spring 54 then urges the inner member 42 to retract (move upwardly) slightly until one of the steel balls 52 rolls into one of the opposed recesses 28 of the outer member 24 and is thereafter "trapped" between a ramped portion of its respective recess 46 of the inner member 42 and the upper end of the recess 28 of the outer member 24. In this manner, the inner member 42 is locked in a desired extended position relative to the outer member 24, as illustrated in FIG. 6. Should the operator thereafter desire an additional amount of extension, perhaps in response to a slight "sinking" of the base plate 62 into relatively-soft ground, the operator maintains his foot 64 on the base plate 62 while leaning the motorcycle 22 in the opposite direction (away from the base plate 62) to thereby further extend the kickstand's inner member 42. A subsequent removal of the operator's foot 64 will similarly allow a slight relative retraction of the inner member 42 under the urging of the tension spring 54, whereupon the another steel ball 52 will roll into and become trapped within an opposed recess 28 of the outer member 24, as seen in FIG. 7.

When the operator seeks to collapse the kickstand 20 and return it to the stowage orientation, the operator leans the motorcycle 22 away from the kickstand's base plate 62 to thereby lift the base plate 62 off the ground. The operator then pivots the kickstand 20 upwardly to its stowage orientation, whereupon the several steel balls 52, other than the one serving to "lock" the inner member 42 at its previous amount of extension, are urged by gravity deep within the recesses 46 of the inner member 42. The operator then uses his foot 64 to slightly elongate the kickstand 20 while in the stowage orientation, thereby uncoupling the inner and outer members 24,42 and permitting the last of the steel balls 52 to fall deep within its respective recess 46 under the influence of gravity, as illustrated in FIG. 8. The inner member 42 is then retracted into the outer member's longitudinal bore 26 by the action of the inner spring 54. The inner spring 54 thereafter further serves to maintain the inner member 42 in a fully-retracted position while in the stowage condition, and to reduce attendant rattling during motorcycle operation.

Referring to FIGS. 9–11, a second exemplary kickstand 70 similarly includes an outer member 72 whose inner surface 74 includes a plurality of longitudinally-spaced recesses 76, each of which is similarly defined by an aperture 78 formed in the wall of the outer member's generally tubular stock. In order to form a more robust end 80 of the recess 76, with which to engage a locking element as further described below, the apertures 78 are covered by a suitable cover plate 82 secured as with fasteners 84 to the outer surface of the outer member 72. The inner member 86 of the second kickstand 70 is also modified such that each of its several recesses 88 is adapted to receive and carry both a gravity-responsive steel ball 90 and a pivoting strut 92.

By way of example only, as best seen in FIG. 11, each strut 92 advantageously includes a pair of lateral arms 94 proximate to a first end 96 that are received in a corresponding transverse channel 98 defined in the inner member 86. The lateral arms 94 on each strut ensure that the strut 92 properly moves with the inner member 86 to effect disengagement of a second, opposite end 100 of the strut 92 with a given recess 76 of the outer member 72 when the inner member 86 is extended slightly as the kickstand 70 is maintained in the stowage orientation. As a further advantage, the inner surface 74 of the outer member's longitudinal bore 102 overlies each strut's arms 94 to thereby ensure that the first end 96 of the strut is maintained within the transverse channel 98, thereby ensuring that the strut's first end 96 will not "pop up," engage the other end 104 of a recess 76 of the outer member 72, and prevent a desired extension of the kickstand 70. An exemplary strut 92 is further described in my U.S. Pat. No. 5,597,057, the disclosure of which is hereby incorporated by reference.

As in the first kickstand 20, each recess 88 of the inner member 86 includes a canted bore 106, and the steel ball 90 is disposed within the bore 106 so that, when the kickstand 70 is pivoted to the operational orientation, each steel ball 90 is independently urged by gravity against the back side 108 of a respective strut 92 to, in turn, further urge the strut 92 to pivot. In this way, the second end 100 of each strut 92 is independently urged against the inner surface 74 of the outer member's longitudinal bore 102 and, ultimately, into a recess 76 of the outer member 72 as it becomes registered with the strut's second end 100. In this regard, it is noted that the second kickstand 70 features improved resolution over that of the first kickstand 20 by using a plurality of spaced recesses in both the outer and inner members 72,86, because the relative spacing of the recesses 76 of the outer member 72 is different from the relative spacing of the recesses 88 of the inner member 86.

While an exemplary embodiment of the invention has been illustrated and described, it is not intended that the exemplary embodiment illustrate and describe all possible forms of the invention. Rather, the words used in the specification are words of description rather than limitation, and it is understood that various changes may be made without departing from the spirit and scope of the invention. For example, while the first and second exemplary motorcycle kickstand employ generally tubular outer members to thereby provide their respective longitudinal bores, it will be appreciated that the invention contemplates any other construction by which the outer member serves to guide the movement of the inner member while further defining the outer member's cooperating recesses. Thus, the invention contemplates, for example, the use of two juxtaposed planar or correspondingly arcuate elements, the opposed faces of which include the respective recesses.

Similarly, while the gravity responsive locking elements of the first and second exemplary kickstands are nominally disposed within and carried by the recesses of the inner member, it will be appreciated that the locking members can alternatively be carried within the recesses of the outer member. Further, while the gravity-responsive element is disposed within a recess of one of the members, the invention nonetheless contemplates use of a carrier or other intermediate structure on which to support a pivoting strut, if any, in the manner disclosed in U.S. Pat. No. 5,449,057, the disclosure of which is hereby incorporated by reference.

And, while the invention has been described in the context of an adjustable-length kickstand for a motorcycle, it will be appreciated that the invention is suitable for use in connection with any article employing an extendable support member or leg whose attitude is or can be changed between an operative orientation and a stowage orientation, including, without limitation, tripods and easels, ladders, stabilizing legs for trailers, movable platforms and scaffolding. The invention is likewise suitable for use with apparatus in which the relative movement of a pair of juxtaposed members is preferably restricted when the two members assume a given attitude, but is otherwise unrestricted when the two members assume a second, different attitude.

What is claimed is:

1. A extendable support member comprising:
   a first elongate member defining a longitudinal bore along a longitudinal axis, wherein an inner surface of the bore includes a recess;

a second elongate member adapted to be received in the longitudinal bore of the first member, wherein an outer surface of the second member includes a recess that is canted relative to the longitudinal axis;

a locking element disposed within the recess of the second member, the locking element being movable within the recess of the second member from a first position to a second position under the influence of gravity as the first and second members are moved from a first relative attitude to a second relative attitude, the first position being characterized by engagement of the locking element with both the recess of the first member and the recess of the second member; and a spring urging the second member toward a retracted position within the longitudinal bore of the first member.

2. The adjustable support member of claim 1, wherein the locking element includes an element that rolls within the recess of the second member.

3. The adjustable support member of claim 2, wherein the rolling element is spherical.

4. The adjustable support member of claim 2, wherein the locking element further includes a strut that is urged toward the first position by the rolling element.

5. The adjustable support member of claim 1, wherein the locking element includes a strut, and wherein the first position is characterized by a projection of a first end of the strut into the recess of the first member.

6. The adjustable support member of claim 5, wherein the strut includes a pair of laterally-extending arms proximate to a second end opposite the first end, and wherein the inner surface of the first member overlies the arms of the strut to maintain the second end of the strut in the recess of the second member.

7. The adjustable support member of claim 1, wherein the spring is disposed within the longitudinal bore of the first member.

8. The adjustable support member of claim 1, wherein the locking element is further movable, within the recess of the second member, from into the first position under the influence of gravity as the first and second members are moved into the first relative attitude.

9. The adjustable support member of claim 1, wherein the first and second members each include at least one additional recess, and wherein the relative longitudinal spacing between the recesses of the first member differs from the relative longitudinal spacing between the recesses of the second member.

10. An extendable support member comprising:

a first member adapted to move between a stowage orientation and an operative orientation, each orientation having a different attitude with respect to a gravitational field, wherein the first member includes a surface having at least one recess;

a second member supported by the first member for relative transnational motion along a first axis, the second member including a surface in close-spaced opposition with the surface of the first member, the surface of the second member having at least one recess defining a recess surface that is canted with respect to the first axis;

a locking element disposed within each recess of the second member, each locking element being movable, within the recess of the second member, under the influence of gravity from a first position to a second position as the first and second members are moved from a first relative attitude to a second relative attitude, wherein the first position is characterized by engagement of the locking element with a respective recess of both the first and second members, and the second position is characterized by the lack of engagement of the locking element with the first member; and a spring urging the second member toward a retracted position within the longitudinal bore of the first member.

11. The extendable support member of claim 10, wherein the locking element includes an element that rolls within the recess of the second member.

12. The extendable support member of claim 11, wherein the rolling element is spherical.

13. The extendable support member of claim 11, wherein the locking element further includes a strut that is urged toward the first position by the rolling element.

14. The extendable support member of claim 10, wherein the locking element includes a strut, and wherein the first position is characterized by a projection of a first end of the strut into the recess of the first member.

15. The extendable support member of claim 10, wherein the first member includes a bore extending along the first axis; wherein the second member is received in the bore of the first member; and wherein the spring is disposed within the bore of the first member.

16. The extendable support member of claim 10, wherein the locking element is further movable, within the recess of the second member, from into the first position under the influence of gravity as the first and second members are moved into the first relative attitude.

17. The extendable support member of claim 10, wherein the first and second members each include at least one additional recess, and wherein the relative longitudinal spacing between the recesses of the first member differs from the relative longitudinal spacing between the recesses of the second member.

* * * * *

UNITED STATES PATENT AND TRADEMARK OFFICE
CERTIFICATE OF CORRECTION

PATENT NO. : 6,494,423 B1
APPLICATION NO. : 10/082611
DATED : December 17, 2002
INVENTOR(S) : Stephen M. Ruth It is certified that error appears in the above-identified patent and that said Letters Patent is hereby corrected as shown below:

Claim 10, column 8, line 4   -   delete "transnational", and insert --translational-- therefor.

Claim 10, column 8, line 22  -   delete "within the longitudinal bore of", and insert --with respect to-- therefor.

Signed and Sealed this

Twenty-second Day of May, 2007

JON W. DUDAS
*Director of the United States Patent and Trademark Office*